(12) United States Patent
Vidal et al.

(10) Patent No.: US 10,589,314 B2
(45) Date of Patent: Mar. 17, 2020

(54) METHOD FOR PRODUCING A DECORATIVE PART OF A MOTOR VEHICLE

(71) Applicant: Compagnie Plastic Omnium, Lyons (FR)

(72) Inventors: Sophie Vidal, Villieu Loyes Mollon (FR); Jérôme Brizin, Arbent (FR); Frédéric Viot, Poncin (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/537,613

(22) PCT Filed: Dec. 18, 2015

(86) PCT No.: PCT/FR2015/053649
§ 371 (c)(1),
(2) Date: Jun. 19, 2017

(87) PCT Pub. No.: WO2016/097654
PCT Pub. Date: Jun. 23, 2016

(65) Prior Publication Data
US 2018/0036766 A1 Feb. 8, 2018

(30) Foreign Application Priority Data

Dec. 19, 2014 (FR) ...................... 14 62959

(51) Int. Cl.
*B05D 1/32* (2006.01)
*B05D 7/02* (2006.01)
*B05D 1/36* (2006.01)
*B05D 7/00* (2006.01)
*B05D 7/24* (2006.01)
*B05D 1/26* (2006.01)
*B05D 7/26* (2006.01)
*B05D 1/02* (2006.01)
*B05D 3/00* (2006.01)
*B05B 13/02* (2006.01)

(52) U.S. Cl.
CPC .............. *B05D 1/325* (2013.01); *B05B 13/02* (2013.01); *B05B 13/0285* (2013.01); *B05D 1/02* (2013.01); *B05D 1/26* (2013.01); *B05D 1/265* (2013.01); *B05D 1/32* (2013.01); *B05D 1/322* (2013.01); *B05D 1/36* (2013.01); *B05D 3/002* (2013.01); *B05D 7/02* (2013.01); *B05D 7/24* (2013.01); *B05D 7/26* (2013.01); *B05D 7/50* (2013.01); *B05D 7/52* (2013.01); *B05D 7/54* (2013.01); *B05D 2201/02* (2013.01); *B05D 2505/00* (2013.01)

(58) Field of Classification Search
CPC . B05D 1/02; B05D 1/26; B05D 1/265; B05D 1/32; B05D 1/322; B05D 1/325; B05D 1/36; B05D 3/002; B05D 7/24; B05D 7/26; B05D 7/50; B05D 7/52; B05D 7/54; B05D 2201/02; B05D 2505/00; B05B 13/00; B05B 13/02; B05B 13/0285
See application file for complete search history.

(56) References Cited

U.S. PATENT DOCUMENTS

| | | | |
|---|---|---|---|
| 4,044,177 A * | 8/1977 | Paulus | B05D 5/06 427/264 |
| 4,358,482 A | 11/1982 | Jubelt | |
| 8,586,149 B2 | 11/2013 | Holubka et al. | |
| 2004/0238985 A1* | 12/2004 | Beckord | C25D 5/022 264/37.33 |
| 2007/0207269 A1 | 9/2007 | Woodhall et al. | |
| 2010/0167038 A1* | 7/2010 | Linnenbrink | B29B 13/022 428/220 |
| 2011/0104394 A1 | 5/2011 | Beier et al. | |

FOREIGN PATENT DOCUMENTS

| | | | |
|---|---|---|---|
| CA | 2272195 A1 | 11/2000 | |
| DE | 102009020264 A1 | 11/2010 | |
| EP | 2319630 A1 | 5/2011 | |
| EP | 2868391 A1 | 5/2015 | |
| EP | 3015854 A1 | 5/2016 | |
| EP | 3031596 A1 | 6/2016 | |
| JP | 04290723 A | * 10/1992 |
| JP | H04290723 A | 10/1992 | |
| JP | H08141491 A | 6/1996 | |
| JP | 2004188283 A | 7/2004 | |
| JP | 2007144376 A | 6/2007 | |
| JP | 2014028357 A | 2/2014 | |
| WO | WO-2006058783 A1 | 6/2006 | |

OTHER PUBLICATIONS

Slembrouck, Igor, "International Search Report," prepared for PCT/FR2015/053649, dated May 2, 2016, four pages.
Japanese Patent Office; Notice of Reasons for Rejection for Japanese Patent Application No. 2017-551370; dated Jul. 16, 2019; 9 pages.

* cited by examiner

*Primary Examiner* — William P Fletcher, III
(74) *Attorney, Agent, or Firm* — Winstead PC

(57) ABSTRACT

The invention relates to a method for producing a motor vehicle part (10) made of a plastic material, said method comprising a step of spraying a product, and the part comprising an area to be protected during the spraying. The method comprises the following steps: applying a fluid material forming a temporary masking layer on the area to be protected, said step being carried out automatically; spraying the product onto the part (10); and removing the temporary masking layer.

24 Claims, 1 Drawing Sheet

METHOD FOR PRODUCING A DECORATIVE PART OF A MOTOR VEHICLE

TECHNICAL FIELD

This invention relates to a method for producing a motor vehicle part made of plastic.

BACKGROUND

More specifically, the method preferably seeks to produce a decorative part, undergoing a step of spraying a product such as a decorative coating, for example paint. This part is called a decorative part since it is partly visible from outside or inside the vehicle when mounted on the vehicle. The decorative part can be for example an exterior tailgate skin assembled on an inner lining, a spoiler, a side door, a bonnet, etc.

The decorative part could have an area to be protected, which must remain as clean as possible and free of sprayed product. According to a first example, the area to be protected is an attachment area for attaching the decorative part to another vehicle part, possibly by bonding. This attachment area must remain as clean as possible before applying glue to it, i.e. it must not be polluted or dirtied before attachment. However, the step of spraying product onto the decorative part generally carried out by spraying the part prior to its attachment to the part to be attached, may generate a deposit of fine paint droplets on the attachment area. The paint particles are in fact dispersed in a mist and may go to the other side of the part, being deposited in the form of a thin film. This may affect the quality of the subsequent attachment, especially the adhesion of the glue or of another material used in particular to create the bond. According to another example, the area to be protected is a section of the decorative surface intended to be free of paint, generally for decorative purposes. In this case also, paint must not be deposited on the area to be protected.

One solution to solve this difficulty consists in depositing on the area to be protected, before applying the paint, an adhesive film to mask the area to be protected. This film offers the advantage of not leaving a deposit detrimental to the bonding or appearance once it has been removed. The film is applied manually then removed at the end of the painting step, also manually. These manual steps are long, expensive and may lack repeatability.

SUMMARY

This invention seeks in particular to simplify the method for producing a motor vehicle part.

Thus, this invention relates to a method for producing a motor vehicle part made of plastic, the method comprising a step of spraying product and the part having an area to be protected during spraying, wherein it comprises the following steps:

applying a fluid material forming a temporary masking layer on the area to be protected, this step being carried out automatically,
spraying the product onto the part, and
removing the temporary masking layer.

The temporary mask layer protects the area to be protected, preventing it from being covered with residues from the painting step. Since the layer is deposited by applying fluid material, an automatic method can be used to deposit it, using a robot. The method can therefore be faster, more precise and easily repeatable.

Note that the use of a temporary masking layer deposited automatically on the area to be protected is especially advantageous, unlike adhesive masking films. Such adhesive films cannot be applied automatically on a 3D part, since the film generates folds as soon as it must follow curves.

Note also that a masking jig could have been used to mask the area to be protected. Such a jig is a wall arranged in front of the area to be protected while spraying product onto the part, forming a protective screen. Nevertheless, the difficulty of such a jig is that it must match the shape of the part precisely to provide a perfect seal against the product sprayed, which is difficult since the parts and the jigs do not always have the same dimensions due to manufacturing tolerances.

Note that spraying product onto the part may for example be a step of spraying paint, varnish, chromium-plating and/or salts in solution. This step of spraying product may occur with or without prior surface treatment.

Furthermore, a plastic part means a part composed mainly of plastic. Obviously, it may include other particles and composite materials.

The method may further comprise one or more of the following characteristics, taken alone or in combination.

The part has a decorative surface coated with the sprayed product and the area to be protected is a local area of the decorative surface free of sprayed product. In particular, the area to be protected is an area free of paint, so as to retain on a decorative part a visible unpainted section, for a stylish effect.

The part is a decorative part, the area to be protected is an area for attaching another motor vehicle part, called part to be attached, and the step of removing the temporary masking layer is followed by a step of attaching the part to be attached to the attachment area of the decorative part. A "part to be attached" means any part likely to be assembled with the decorative part, in particular any type of functional element. The attachment area is generally arranged on the side opposite the painted side. It is for example a bonding area. It is clear that the method proposed here is particularly interesting when attaching the part by a surface bond at the attachment area. In this case, in fact, it is advantageous to be able to present an extremely clean surface. For example, the part is attached by bonding, by applying a layer of glue on the attachment area. According to another example, the part is attached by additive printing or 3D printing, by applying a bonding layer created by printing. Note also that the step of attaching the part to be attached to the attachment area of the decorative part may take place with or without prior surface treatment.

The part to be attached is attached by applying a glue on the attachment area of the decorative part.

The part is attached by additive printing or "3D printing", by applying a bonding layer deposited by printing. In this case, attachment can be carried out by mechanical anchoring or adhesion of the materials.

The temporary masking layer comprises a hot melt glue. Note that a hot melt glue is one which becomes fluid under the action of heat and which can therefore be easily be applied in liquid state. Once applied, the glue resolidifies on cooling, adhering to the surface without leaving any gap, and can therefore provide a seal against the paint and resistance to knocks during handling, thereby protecting the area to be protected during the step of spraying product such as paint. In addition, this cooled glue can be removed quickly and easily from the part due to its residual flexibility and good cohesion at ambient temperature, in order to remove the layer, preferably in one go, without fragmenting into many pieces. This hot melt glue is preferably not cross-linkable, i.e. on heating it again, it becomes fluid again and can easily be reused. Hot melt glues generally comprise as basic constituents thermoplastic polymers such as polyethylene, polypropylene, polyamide or EVA type copolymers, to which tackifying resins and additives are added. Hot melt glues are generally liquid above 110° C. and are hard below 90° C. An example of hot melt glue is marketed by Henkel under the name of "TEROSON CF 438". A former name of this type of glue is "MACROPLAST CF 438". A particularly interesting example of hot melt glue that can be used is a polyamide type glue, such as that marketed by the company Henkel under the name of "TECHNOMELT PA 2420" and the glue marketed by Henkel under the reference "HENKEL 6208".

The temporary masking layer comprises a peelable varnish such as that marketed by the company Zuelch under reference 826-W1272-00 or by the company EFTEC under reference EFCOAT PO 380. This type of peelable varnish is generally composed of a PVC-based polymer (polyvinyl chloride). Another type of peelable varnish can be used, similar to peelable solder masks, known under the name of "blue solder masks", such as that marketed by Atotech under reference "SD 2954". Such masks can be applied by screen printing.

The temporary masking layer comprises a hot melt glue. The part is hooked to a hooking jig during the step of spraying product and the temporary masking layer is pressed against the jig to be held by bonding on the jig. The part is therefore bonded temporarily against the jig. This holds the decorative part securely during the painting step. Advantageously therefore, the same temporary layer acts as a layer masking the area to be protected and a layer sticking the part to the jig. Preferably, the decorative part is pressed against the jig automatically.

The temporary masking layer comprises a hot melt glue. The temporary masking layer is applied at a temperature greater than 110° C., preferably between 140° C. and 220° C., more preferably between 150° C. and 200° C. and the temporary masking layer is removed at a temperature less than 90° C., preferably between 10° C. and 40° C.

The step of removing the temporary masking layer is followed by a step of reusing the material which formed this temporary masking layer. For example, a temporary masking layer comprising a non-cross-linked hot melt glue can be reused. Reuse may comprise a remelting step at a temperature greater than 140° C. in a melting kettle. A step of cleaning the material to be reused could be planned, for example by filtering the material according to observed physical properties such as density, mechanical effect, particle size, etc.

The temporary masking layer comprises a hot melt glue having a melting point Tc different from, and preferably relatively low compared with, a melting point Tp of the sprayed product. This is particularly advantageous to simplify recycling, or even reuse, of the hot melt glue. With a different melting point, in fact, the glue can be separated from the product, for example by melting the glue while maintaining the product in non-liquid state. A filter can therefore be used to remove the product. For example, the melting point Tc of the glue is less than 150° C., preferably less than 130° C., more preferably about 100° C.; and/or the melting point Tp of the sprayed product is greater than 150° C., preferably greater than 180° C., more preferably about 200° C. According to an example, the hot melt glue is polyamide (PA) of melting point Tc about 100° C., and the sprayed product is a polyurethane type polymer paint of melting point Tp about 200° C.

The step of reusing the temporary masking layer comprises the following steps: recovering the temporary masking layer after removing it, grinding it, drying it, introducing it into an extruder at a temperature T greater than the melting point of the masking layer and less than the melting point of the sprayed product, removing the product by filtering and/or recovering the material to form a new masking layer. Advantageously, during extrusion, an additive can be added, for example one or more stabilizers, to the masking layer so that it can be recycled several times. Note that all the steps can be implemented and in the order given, or some of them can be omitted or replaced by other steps, or the order of implementation can be changed. The solution proposed here allows operational recycling of the masking layer, while ensuring a certain purity, without product residues such as paint residues.

The step of removing the temporary masking layer is followed by a step of degreasing and/or of surface treatment of the area to be protected. The surface treatment can be flaming, treatment by plasma technology and/or by corona effect. Degreasing can be carried out for example using a wipe.

The temporary masking layer is deposited by a configurable process control system, such as a six-axis robot, to predefine the width and thickness of the temporary masking layer. For example, the width is between 10 mm and 30 mm (millimeters), about 20 mm, and the thickness is between 1 mm and 3 mm.

A step of curing the sprayed product layer takes place after the step of applying the temporary masking layer on the area to be protected, preferably at a temperature greater than 80° C. It is for example a paint curing step.

The invention further relates to the use of a method as described above for producing a motor vehicle exterior part, such as a tailgate skin, a front or rear bumper skin, a front or rear wing, a window pillar, a rocker box, a side door, a bonnet, a convergent such as a roof spoiler.

The invention also relates to an installation for producing a motor vehicle part comprising plastic material, including the following devices arranged one after another on a part production line:
a device for automatically applying fluid material forming a temporary masking layer on the part,
a device for spraying product onto the part,
a device for removing the temporary masking layer,
and optionally a station for reconditioning the temporary masking layer for reuse.

Advantageously, the station for reconditioning the temporary masking layer comprises an extruder at a temperature T, T being greater than the melting point of the masking layer and less than the melting point of the sprayed product, and provided with a filter, for example a rotary filter, to separate the masking layer from the product.

BRIEF DESCRIPTION OF THE DRAWINGS

The invention will be better understood on reading the accompanying figures, which are given solely by way of example and not limiting in any way, in which.

DETAILED DESCRIPTION

Figure 1:
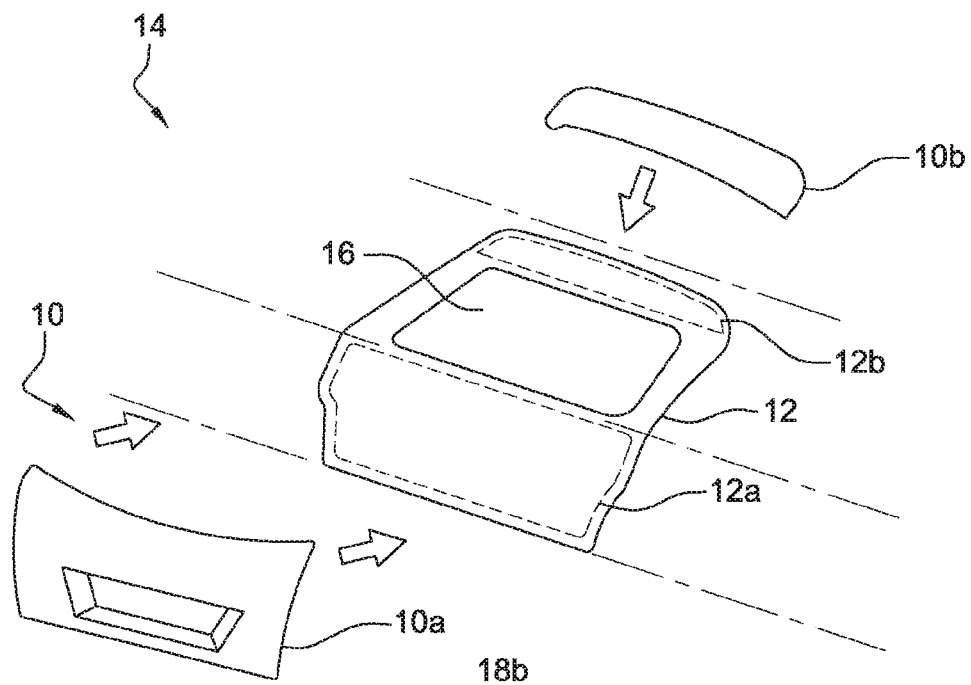
FIG. 1 is a diagrammatic exploded perspective view of a tailgate outer skin made according to one embodiment of the method and assembled on an interior tailgate lining.

We refer to FIG. 1. A motor vehicle decorative part 10 produced according to the method described above may be a tailgate outer skin. This outer skin 10 is intended to be attached to a tailgate lining 12, so as to form a tailgate 14.

Figure 2:
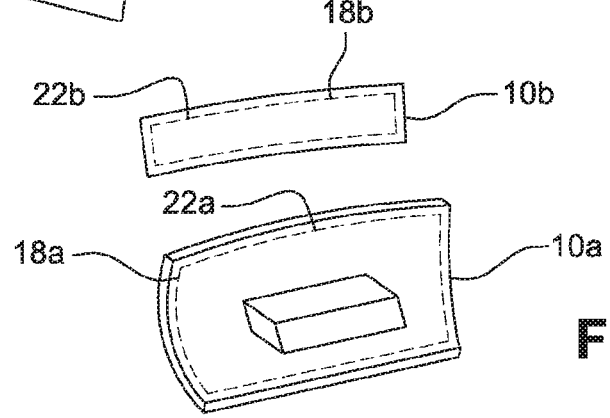
FIG. 2 is an interior view of the outer skin of FIG. 1.

In this example, the decorative part 10 has two sections 10a, 10b: a lower outer skin 10a, for covering the lower section of the lining 12, and an upper outer skin 10b, for covering the upper section of the lining 12. The decorative part 10 is generally made of injected thermoplastic material, for example polypropylene. It has a decorative surface which is painted, visible from outside the vehicle, corresponding to the outer surfaces of the skins 10a and 10b, illustrated diagrammatically on FIG. 1. It also has an inner surface corresponding to the inner surfaces of the skins 10a and 10b, illustrated diagrammatically on FIG. 2. The inner surface of the skins 10a, 10b is not intended to be visible once the tailgate is assembled and mounted on the motor vehicle. It is a surface which can be qualified as "technical", in the sense that it is not intended for decoration and may therefore have technical features including means for attaching the decorative part 10 to the tailgate lining 12.

The tailgate lining 12 has the general shape of a frame having an opening 16 for receiving a rear window. This tailgate lining 12 is for example made of a reinforced thermosetting material.

In this example, the decorative part 10 is attached to the tailgate lining 12 by bonding. The decorative part 10 therefore has two areas to be protected 18a and 18b, i.e. attachment areas 18a and 18b, arranged respectively on the inner surface of the skins 10a, 10b. The attachment areas 18a and 18b are shown in dotted lines on FIG. 2. At the end of the method for producing the decorative part 10, these attachment areas 18a and 18b will be covered with bonding tracks, then bonded to the tailgate lining 12 to permanently attach the decorative part 10 to the tailgate lining 12.

Figure 3:
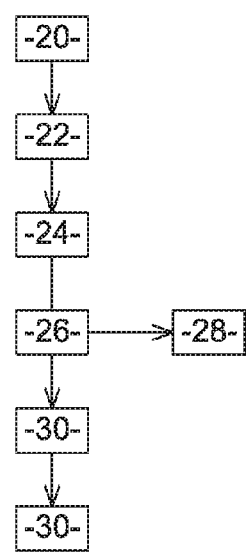
FIG. 3 is a diagram illustrating a method for producing the outer skin of FIG. 1.

The method for producing the decorative part 10 will now be described, with reference to FIG. 3. It is understood that the steps for producing the "decorative part 10" are described generally for simplification purposes, but these steps are implemented firstly on the lower skin 10a, secondly on the upper skin 10b, generally independently.

The method starts by an injection 20 of material in a mold to form the body of the decorative part 10 by molding, more precisely to form firstly the lower skin 10a and secondly the upper skin 10b. Before painting the decorative part 10, a step 22 is carried out in which a temporary masking layer 22a, 22b is applied on the area to be protected 18a, 18b. Step 22 is carried out automatically by a robot. The layer 22a, 22b is produced at the same position as the area to be protected 18a, 18b. Thus, it is shown fictitiously on FIG. 2, although it is not present on the final decorative part 10 shown on FIG. 2.

In this example, the temporary masking layer 22a, 22b comprises a hot melt glue as described above. The step 22 of applying the temporary masking layer 22a, 22b is carried out at a temperature greater than 110° C., preferably between 140° C. and 220° C., more preferably between 150° C. and 200° C. Furthermore, step 22 is carried out by a configurable robot to predefine the width and thickness of the temporary masking layer 22a, 22b. For example, the width of the layer 22a, 22b is about 20 mm and the thickness is between 1 mm and 3 mm. In this case, the robot displacement speed is between 50 mm and 200 mm per second, with a glue flow rate of between 20 and 80 rpm (revolutions per minute). Furthermore, the layer is applied by means of an extended nozzle positioned as close as possible to the part, with a distance of between 2 mm and 8 mm between the part and the end of the nozzle. The glue is therefore deposited more precisely. In addition, so that the layer can be spread over a bonding track of a certain length, for example 25 mm, the viscosity of the glue can be varied, depending on the glue temperature, type and reference.

The step 22 of applying the temporary masking layer 22a, 22b on the area to be protected 18a, 18b is followed by a step 24 in which a product, in this case paint, is sprayed onto the decorative part. This step 24 is carried out by spraying paint onto the decorative surface corresponding to the outer surfaces of the skins 10a and 10b. In this example of spraying paint, step 24 includes a step of curing in an oven for a period between 20 and 30 minutes per part and is carried out at a temperature of about 80° C. The inner surfaces of the skins 10a and 10b are not painted directly, but indirectly receive paint residues deposited in the form of a thin film, due to the paint mist generated by spraying. Thus, the temporary masking layer 22a, 22b, which is sealed at this temperature, probably receives paint droplets instead of the area to be protected 18a, 18b that it covers.

According to a particularly advantageous improvement, during step 24 of applying paint, the decorative part 10a, 10b is hooked to a hooking jig and the temporary masking layer 22a, 22b is pressed against the jig to be held by bonding on the jig.

Step 24 of spraying product is followed by a step 26 in which the temporary masking layer 22a, 22b is removed. For example, the end of the layer is raised and pulled. This step of removing the layer 22a, 22b is carried out at a temperature less than 90° C., preferably between 10° C. and 40° C. At this temperature, the hot melt glue forming the layer 22a, 22b is cooled and flexible and can be removed quickly and easily without fragmenting.

Step 26 of removing the temporary masking layer is followed by a step 30 of degreasing, and optionally of surface treatment of the attachment area.

According to a particularly advantageous embodiment, the step 26 of removing the temporary masking layer is also followed by a step 28 of reusing the material which formed this temporary masking layer. According to an example, the temporary masking layer comprises a hot melt glue having a melting point Tc that is relatively low compared with a melting point Tp of the sprayed product. According to an example, the hot melt glue is polyamide (PA) of melting point Tc about 100° C., and the sprayed product is a polyurethane type polymer paint of melting point Tp about 200° C. The step 28 of reusing the temporary masking layer comprises the following steps: recovering the temporary masking layer after removing it, grinding it, drying it, introducing it into an extruder at a temperature T of about 120° C.-130° C., therefore greater than the melting point Tc of the masking layer and less than the melting point of the sprayed product. Thus, the masking layer melts, but not the sprayed product. The product is then removed at end of extrusion by filtration using a coarse rotary filter to separate the masking layer from the product. The material is then recovered to form a new masking layer. Advantageously, during extrusion, an additive can be added, for example, stabilizers and/or other additives, to the masking layer so that it can be recycled several times.

Step 30 is then followed by a step 32 in which the part to be attached is attached to the attachment area of the decorative part, i.e. in this example a step in which the tailgate lining 12 is attached to the attachment area 18a, 18b of the decorative part 10. The attachment areas 12a, 12b have been shown diagrammatically on FIG. 1.

At the end of this step 32, the tailgate 14 is obtained, ready to be assembled on the vehicle.

Such a production method is implemented on an installation comprising the following devices arranged one after another on a line for producing the part 10.

a device for automatically applying fluid material forming a temporary masking layer 22a, 22b on the part,
a device for spraying product onto the part 10,
a device for removing the temporary masking layer 22a, 22b.

In addition, the installation preferably includes a station for reconditioning the temporary masking layer for reuse. Advantageously, this station comprises an extruder at a temperature T, T being greater than the melting point of the masking layer and less than the melting point of the sprayed product, and provided with a filter, optionally a rotary filter, to separate the masking layer from the product. The filter is preferably coarse, i.e. with filter meshes of between 150 μm and 600 μm (micrometers).

According to another embodiment, the part to be produced has a decorative surface coated with the sprayed product and the area to be protected is a local area of the decorative surface free of sprayed product. For example, the outer surfaces of the skins 10a and 10b of the decorative part 10 have a local unpainted area, free of paint and which is to be protected in the same way as the areas to be protected 18a, 18b. It is understood that the method described above applies similarly to such areas to be protected and that the entire description can be read with such an application.

The invention is not limited to the embodiments described and other embodiments will be clearly apparent to those skilled in the art.

In particular, the method is used to manufacture a tailgate skin 10 but many other parts can be produced using this method, in particular a front or rear bumper skin, a front or rear wing, a window pillar, a rocker box, a side door, a bonnet, a convergent such as a roof spoiler.

In addition, according to another example, the temporary masking layer 22a, 22b comprises a peelable varnish instead of the hot melt glue. For example, a peelable varnish such as that marketed by the company Zuelch under reference 826-W1272-00 is used. This varnish is deposited automatically, with a drying time of about two hours at ambient temperature. The drying time can be reduced by increasing the temperature, for example 15 minutes drying at a temperature of about 140° C.

Furthermore, the attachment of the decorative part 10 and of the part to be attached 12 is, in the example described above, by bonding, but other types of attachment are possible, in particular other types of attachment by surface bonding requiring a very clean surface to be attached, with no residues. In particular, attachment by mechanical hooking on a relatively large area can be considered, during which a bonding layer produced by additive printing or 3D printing is applied to the attachment area, in order to hook the part to be attached to the decorative part 10.

The invention claimed is:

1. A method for producing a motor vehicle part made of plastic, the method comprising a step of spraying product and the part having an area to be protected during spraying, the method comprising:
    applying a fluid material forming a temporary masking layer on the area to be protected, this step being carried out automatically and the temporary masking layer comprising a hot melt glue;
    spraying the product onto the part; and
    removing the temporary masking layer.

2. The method according to claim 1, wherein the part is hooked to a hooking jig during the step of spraying product and the temporary masking layer is pressed against the jig to be held by bonding on the jig.

3. The method according to claim 1, in which the temporary masking layer is applied at a temperature greater than 110° C.

4. The method according to claim 3, in which the temporary masking layer is applied at a temperature between 140° C. and 220° C., and the temporary masking layer is removed at a temperature between 10° C. and 40° C.

5. The method according to claim 1, in which the step of removing the temporary masking layer is followed by a step of reusing the material which formed this temporary masking layer.

6. The method according to claim 1, the temporary masking layer comprising a hot melt glue having a melting point Tc that is less than a melting point Tp of the sprayed product.

7. The method according to claim 6, wherein the part is a decorative part, the area to be protected is an area for attaching another motor vehicle part, called part to be attached, and the step of removing the temporary masking layer is followed by a step of attaching the part to be attached to the attachment area of the decorative part.

8. The method according to claim 6, wherein the melting point Tc of the glue is less than 130° C. and the melting point Tp of the sprayed product is greater than 180° C.

9. The method according to claim 1, wherein the step of reusing the temporary masking layer comprises the following steps: recovering the temporary masking layer after removing it, grinding it, drying it, introducing it into an extruder at a temperature T greater than the melting point of the masking layer and less than the melting point of the sprayed product, removing the product by filtering, and recovering the material to form a new masking layer.

10. The method according to claim 9, wherein the step of reusing the temporary masking layer comprises adding an additive comprising one or more stabilizers in the masking layer.

11. The method according to claim 1, wherein the hot melt glue is polyamide and the sprayed product is a polyurethane polymer paint.

12. The method according to claim 11, wherein the part is a decorative part, the area to be protected is an area for attaching another motor vehicle part, called part to be attached, and the step of removing the temporary masking layer is followed by a step of attaching the part to be attached to the attachment area of the decorative part.

13. The method according to claim 1, in which the step of removing the temporary masking layer is followed by a step of degreasing and/or of surface treatment of the area to be protected.

14. The method according to claim 1, the temporary masking layer being deposited by a configurable robot to predefine the width and thickness of the temporary masking layer.

15. The method according to claim 1, wherein the part has a decorative surface coated with the sprayed product and the area to be protected is a local area of the decorative surface free of sprayed product.

16. The method according to claim 1, wherein the part is a decorative part, the area to be protected is an area for attaching another motor vehicle part, called part to be attached, and the step of removing the temporary masking layer is followed by a step of attaching the part to be attached to the attachment area of the decorative part.

17. The method according to claim 1, in which the part to be attached is attached by applying a glue on the attachment area of the decorative part.

18. The method according to claim 1, in which the part to be attached is attached by additive printing or 3D printing, by applying a bonding layer created by printing.

19. The method according to claim 1, wherein the hot melt glue is a polyamide hot melt glue having a melting point of about 100° C.

20. The method according to claim 19, wherein the part is a decorative part, the area to be protected is an area for attaching another motor vehicle part, called part to be attached, and the step of removing the temporary masking layer is followed by a step of attaching the part to be attached to the attachment area of the decorative part.

21. An installation for producing a motor vehicle part made of plastic, the installation comprising the following devices arranged one after another on a line for producing the motor vehicle part:
- a device for automatically applying fluid material forming a temporary masking layer on the part, said fluid material being a hot melt glue;
- a device for spraying product onto the part; and
- a device for removing the temporary masking layer.

22. The installation according to claim 21, comprising, after the device for removing the temporary masking layer, a station for reconditioning the temporary masking layer for reuse.

23. The installation according to claim 21, wherein the station for reconditioning the temporary masking layer comprises an extruder at a temperature T, T being greater than the melting point of the masking layer and less than the melting point of the sprayed product, and provided with a filter to separate the masking layer from the product.

24. The method according to claim 1, wherein the hot melt glue is not cross-linkable.

* * * * *